US011263652B2

(12) United States Patent
Inoue

(10) Patent No.: US 11,263,652 B2
(45) Date of Patent: Mar. 1, 2022

(54) NON-TRANSITORY COMPUTER-READABLE MEDIUM STORING GAME PROGRAM, GAME PROCESSING METHOD, AND INFORMATION PROCESSING APPARATUS

(71) Applicant: GREE, INC., Tokyo (JP)

(72) Inventor: Kenji Inoue, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/893,908

(22) Filed: Jun. 5, 2020

(65) Prior Publication Data

US 2020/0302461 A1    Sep. 24, 2020

Related U.S. Application Data

(63) Continuation of application No. 14/446,946, filed on Jul. 30, 2014, now Pat. No. 10,706,437.

(51) Int. Cl.
*G06Q 30/02* (2012.01)
*G06Q 50/00* (2012.01)

(52) U.S. Cl.
CPC ......... *G06Q 30/0209* (2013.01); *G06Q 50/01* (2013.01)

(58) Field of Classification Search
None
See application file for complete search history.

(56) References Cited

U.S. PATENT DOCUMENTS 9,833,694 B1  12/2017  Subramani
2002/0025853 A1  2/2002  Kojima et al.
(Continued)

FOREIGN PATENT DOCUMENTS

JP  2012-143271 A  8/2012
JP  2013-75189 A   4/2013
(Continued)

OTHER PUBLICATIONS

D. Lopes, M. Esteves and C. Mesquita, "Video game interaction and reward mechanisms applied to business applications: A comparative review," 7th Iberian Conference on Information Systems and Technologies (CISTI 2012), 2012, pp. 1-6. (Year: 2012).*
(Continued)

*Primary Examiner* — Sam Refai
*Assistant Examiner* — Rashida R Shorter
(74) *Attorney, Agent, or Firm* — Oliff PLC

(57) ABSTRACT

A non-transitory computer-readable medium storing a game program for a game which is played through a network causes a computer to realize a selection receiving function of receiving, from one user, the selection of whether to transmit a message to other user, an extraction function of extracting at least one other user to which the message is transmitted, on the basis of a certain condition, a message transmitting function of transmitting the message to the at least one other user extracted by the extraction function when the selection receiving function receives the selection indicating that the message is transmitted to the other user, and a reward giving function of giving a reward to the one user when the message transmitting function transmits the message to the at least one other user extracted by the extraction function.

9 Claims, 8 Drawing Sheets

(56) References Cited

U.S. PATENT DOCUMENTS

| | | | |
|---|---|---|---|
| 2007/0265915 A1* | 11/2007 | Gould | H04L 51/38 |
| | | | 705/14.14 |
| 2012/0150695 A1* | 6/2012 | Fan | G06Q 30/02 |
| | | | 705/27.1 |
| 2012/0176370 A1 | 7/2012 | Imai et al. | |
| 2013/0006736 A1* | 1/2013 | Bethke | A63F 13/69 |
| | | | 705/14.12 |
| 2013/0296060 A1* | 11/2013 | Hayden | G07F 17/3225 |
| | | | 463/42 |
| 2014/0012769 A1* | 1/2014 | Wang | G06F 3/0481 |
| | | | 705/319 |
| 2014/0323225 A1* | 10/2014 | Agrawal | A63F 13/795 |
| | | | 463/42 |
| 2015/0095126 A1 | 4/2015 | Inoue | |
| 2018/0028903 A1* | 2/2018 | Subramani | A63F 13/35 |

FOREIGN PATENT DOCUMENTS

| | | |
|---|---|---|
| JP | 2013-81795 A | 5/2013 |
| JP | 2013-138730 A | 7/2013 |
| JP | 5277305 B2 | 8/2013 |
| JP | 5530554 B1 | 4/2014 |

OTHER PUBLICATIONS

Sep. 20, 2017 Statement of Patent Opposition by Opponent in Opposition No. 2017-700891.

Sep. 20, 2017 Description of Evidence by Opponent in Opposition No. 2017-700891.

Oct. 30, 2017 Hearing issued by Japanese Patent Office in Opposition No. 2017-700891.

Nov. 27, 2017 Reply by Opponent in Opposition No. 2017-700891.

Dec. 19, 2017 Notice of Reasons for Revocation issued by Japanese Patent Office in Opposition No. 2017-700891.

Feb. 19, 2018 Amendment Request by GREE in Opposition No. 2017-700891.

Feb. 19, 2018 Opinion by GREE in Opposition No. 2017-700891.

Jul. 3, 2018 Notice of Reasons for Revocation issued by Japanese Patent Office in Opposition No. 2017-700891.

May 11, 2018 Opinion by Opponent in Opposition No. 2017-700891.

May 11, 2018 Description of Evidence by Opponent in Opposition No. 2017-700891.

Aug. 31, 2018 Amended Scope of Patent Claims by GREE in Opposition No. 2017-700891.

Aug. 31, 2018 Opinion by GREE in Opposition No. 2017-700891.

Aug. 31, 2018 Amendment Request by GREE in Opposition No. 2017-700891.

Natsu-Mikan, "Dorakore [Dragon Collection] travel diary—Nov. 25 updated information," <https://drkrtbnk.blog.fc2.com/blog-entry-39 html> saved Nov. 25, 2011, searched on Sep. 1, 2017.

Internet Archive, "Dragon Collection Wikipedia," <https://web.archive.org/web/20130329051936/https://ja.wikipedia.org/wiki/%E3%83%89%E3%83%A9%E3%82%B4%E3%83%B3%E3%82%B3%E3%B3%AC%E3%82%AF%> saved on Mar. 29, 2013, searched on Sep. 1, 2017.

Internet Archive, "Dragon Collection use instructions/review—popular smart phone game app for social game—smart phone information [from]<<AndRock>>," <https://web.archive.org/web/20130808144833/http://androck.jp/app/game/socialgame/dragoncollection/> saved on Aug. 8, 2013, searched on Sep. 12, 2017.

Internet Archive, "Dorakore Official [Dragon Collection]—Dragon Collection card battle RPG KONAMI." <http://web.archive.org/web/20130926035538/http://www.konami.jp:80/dracolle/pc/faq/index.php5> saved on Sep. 26, 2013, searched on Sep. 1, 2017.

Internet Archive, "Mobage General Information Bureau It's here!! Rage of Bahamut—2700 MobaCoin equivalent gacha is free of charge!!" <http://web.archive.org/web/20130630211913/http://mobage0.blog.fc2.com/blog-entry-28.html> saved on Jun. 30, 2013, searched on Sep. 1, 2017.

Internet Archive, "Final Fantasy Brigade | Square Enix," <https://web.archive.org/web/20120804043602/http://blog.jp.square-enix.com:80/ff_b/2012/07/get-2.html> saved on Aug. 4, 2012, searched on Sep. 4, 2017.

Internet Archive, "Friendship Revival Campaign—Maple Story" <http://web.archive.org/web/20130427103728/http:/maplestory.nexon.co.jp:80/campaign/comeback2013.asp> saved on Apr. 27, 2013, searched on Sep. 1, 2017.

"static.nexon.co.jp," <http://static.nexon.co.jp/maplestory_4th/campaign/comeback2012/img_sendmail.png> searched on Sep. 1, 2017.

Sep. 12, 2017 Web page source indicated by Plaintiffs No. 4 evidence (excerpt).

Internet Archive, "Puzzles & Dragons" Beginners should keep this in mind—The basic information summary Famitsu app, <https://web.archive.org/web/20120517123703/https://app.famitsu/com/20120516_62282/> saved on May 17, 2012, searched on Sep. 8, 2017.

Internet Archive, "Demon Warrior Soul online manual—communication" <http://web.archive.org/web/20130109014517/http://cog-members.oni-soul.jp/sp/manual/page54.html> saved on Jan. 9, 2013, searched on Sep. 11, 2017.

Internet Archive, "Basic play free online MMORPG/Angel Love Online" <https://web.archive.org/web/20130311182202/http://www.angelloveonline.jp/news/event/2013/0307_02_cp_comebuck.php> saved on Mar. 11, 2 013, searched on Sep. 1, 2017.

Internet Archive, "Absolute submission even on the big screen! "Purgatory's Crusade" for Smartphone Famitsu app" <https://web.archive.org/web/20130521221706/https://app.famitsu/com/20120627_73847/> saved on May 21, 2013, searched on Sep. 1, 2017.

Internet Archive, "High Fantasy—MMORPG Perfect World" <https://web.archive.org/web/20120602062217/http://pw.mk-style.com/main/library/special/campaign/120327/sub/event_03.php> saved on Jun. 2, 2012, searched on Sep. 1, 2017.

FC 2 Inc., "FC2 blog specification—What you can do with FC2 blog / Manual / FC2 blog help" <https://help.fc2.com/blog/manual/group2/1403> printed on May 2, 2018, searched on May 2, 2018.

Matsu-mikan, "Dorakore [Dragon Collection] travel diary—Nov. 25 updated information" <https://drkrtbnk.blog.fc2.com/blog-entry-39.html> saved on Nov. 25, 2011, searched on May 2, 2018 (DOCUMENT 1).

Matsu-mikan, "Dorakore [Dragon Collection] travel diary—Nov. 25 updated information" <https://drkrtbnk.blog.fc2.com/blog-entry-39.html> saved on Nov. 25, 2011, searched on May 2, 2018 (DOCUMENT 2).

Matsu-mikan, "Dorakore [Dragon Collection] travel diary—Nov. 25 updated information," <https://drkrtbnk.blog.fc2.com/blog-entry-39.html> saved on Nov. 25, 2011, searched on May 2, 2018 (DOCUMENT 3).

"Nov. 25 updated information New card information / Dragon Collection Research Institute," <https://ameblo.jp/tk-002/entry-11088805053.html> saved on Nov. 25, 2011, searched on May 2, 2018.

Web page source indicated by Plaintiffs No. 14 evidence (excerpt), printed on May 2, 2018.

"Coral Area Gacha New SR card / Dragon Collection Research Institute," <https://web.archive.org/web/20111129102720/https://ameblo.jp/tk-002/entry-11088797998.html> saved on Nov. 29, 2011, searched on May 2, 2018.

"Coral Area Gacha New SR card / Dragon Collection Research Institute" <https://web.archive.org/web/20111130140240/https://ameblo.jp:80/tk-002/entry-11088798492.html> saved on Nov. 30, 2011, searched on May 2, 2018.

"Dragon Collection Flame Deck Protective Capacity in order of MAX, Dragon Collection capture/secret tricks (Dorakore) complete collection," <https://web.archive.org/web/20111101092006/http://www.dragoncollection/net:80/monster/honoobougyo.html> saved on Nov. 1, 2011, searched on May 2, 2018.

"Dragon Collection Flame Deck Protective Capacity in order of MAX, Dragon Collection capture/secret tricks (Dorakore) complete

(56) References Cited

OTHER PUBLICATIONS collection," <https://web.archive.org/web/20111211015220/http://www.dragoncollection/net:80/monster/honoobougyo.html> saved on Dec. 11, 2011, searched on May 2, 2018.
"Let's enjoy that "KimoKawa" in the browser! Report on production launch of Great War of Nyanko among everyone" Cute cat photo report also published, saved on Jul. 21, 2017, searched on Feb. 13, 2018.
Nov. 22, 2018 Opposition Decision issued by Japanese Patent Office in Opposition No. 2017-700891.
Partial English Translation of Documents.
Jun. 11, 2019 Office Action issued in Japanese Patent Application No. 2017-031023.
Cosmic Break, "MMO Battle Shooting, June 7 Update Announcement" <http://www.cosmicbreak.jp/atgames/info/topic/16089> Jun. 6, 2012 [searched on May 8, 2019].
Phantasy Star Online 2, Players' Site, "Comeback & Thanks Campaign", <http://pso2.jp/players/news/_20130206/>, Feb. 25, 2013 [searched on May 8, 2019].
Angel Love Online, "Comeback Campaign Opening", <http://www.angelloveonline.jp/news/event/2013/0307_02_cp_comebuck.php>, Mar. 7, 2013 [searched on May 9, 2019].
Mobile Ascii, "GREE 'Purgatory Crusade,' Spring New Members and Comeback Campaign Begins!", <http://mobileascii.jp/elem/000/000/067/6//93>. May 29, 2013 [searched on May 8, 2019].
4Gamer, "ELSWORD, Event Opening Commemorating Update for 2 Kinds of New Dungeons and Level Cap at 63", <https://www.4gamer.net/games/040/G004029/20130711091>, Jul. 11, 2013 [searched on May 8, 2019].
Mar. 3, 2020 Decision of Refusal issued in Japanese Patent Application No. 2017-031023.
Sep. 1, 2020 Office Action issued in Japanese Patent Application No. 2017-31023.
Cosmic Break, "MMO Battle Shooting Update" <http://www.cosmicbreak.jp/atgames/info/topic/16089> (Jun. 6, 2012).
Sega, "Phantasy Star Online 2: Camback & Sunkus Campaign" <http://pso2.jp/players/news/i_ 20130206/> (Feb. 25, 2013).
Findstar Group, "10% Revitalization! A Successful Case of Bringing Back Inactive Customers Using Domicile and Letters" <https://www.tsuhan-marketing.com/blog/offlinecrm/inactivecustomer_dmletter_case> (Dec. 16, 2011).
Angel Love Online, "Cumbuck Campaign," <http://www.angelloveonline.jp/news/event/2013/0307_02_cp_comebuck.php> (Mar. 7, 2013).
Mobile ASCII, "GREE's Crusade of Purgatorio" <http://mobileascii.jp/elem/000/000/067/67793/> (Mar. 29, 2013).
4Gamer, "ELSWORD" <https://www.4gamer.net/games/040/G004029/20130711091/> (Jul. 11, 2013).
Mar. 3, 2020 Decision of Dismissal Amendment issued in Japanese Patent Application No. 2017-031023.
Diogo Lopes; Video game interaction and reward mechanisms applied to business applications "IEEE 2012" (Year 2012).
Mook, E., "Phantasy Star Online 2 Start Guidebook," Enterbrains, Inc., Jul. 11, 2012, p. 22 along with a partial English translation.
"Kingdoms & Lords' Rise from a Mere Farmer to a Head of Major Power!," Enterbrain, Inc., Aug. 10, 2012, printout from http://app.famitsu.com/20120810_83506, along with a partial English translation.
"Crows x Worst—Strongest Legend -," Monthly Appli Style, East Press Co., Ltd., Mar. 28, 2013, vol. 1, No. 4, pp. 62-63, along with a partial English translation.
Japanese Office Action dated Jul. 15, 2014, issued in Japanese Patent Application No. 2014-086284.
Reward for Invited Newbies dated Nov. 12, 2012.
Notification of Reasons for Refusal dated Mar. 13, 2018, of corresponding Japanese Application No. 2017-031023, along with an English translation.
Japanese Office Action dated Oct. 25, 2016, of corresponding Japanese Application No. 2015-192696, along with an English translation of relevant portions.
Decision of Rejection for JP Appl. No. 2014-086284 dated Oct. 28, 2014, with English translation.
Japanese Content of Pre-Appeal Examination Report dated Mar. 24, 2015 along with an English translation from corresponding Japanese Patent Application No. 2014-086284.
Japanese Notice of Reasons for Rejection dated Mar. 31, 2015 along with an English translation from corresponding Japanese Patent Application No. 2015-010739.
Notice of Reasons for Rejection dated Jun. 30, 2015 of Japanese Application No. 2015-010739 along with its English translation.
May 18, 2021 Office Action issued in Japanese Patent Application No. 2020-096650.
Aug. 24, 2021 Trial and Appeal Decision issued in Japanese Patent Application No. 2017-031023.
Dec. 21, 2021 Office Action issued in Japanese Patent Application No. 2020-096650.
4Gamer, "GREE, Android Version, "Wicked Wives" Appearance" <https://www.4gamer.net/games/152/G015205/20120330095/> Mar. 30, 2012).

\* cited by examiner

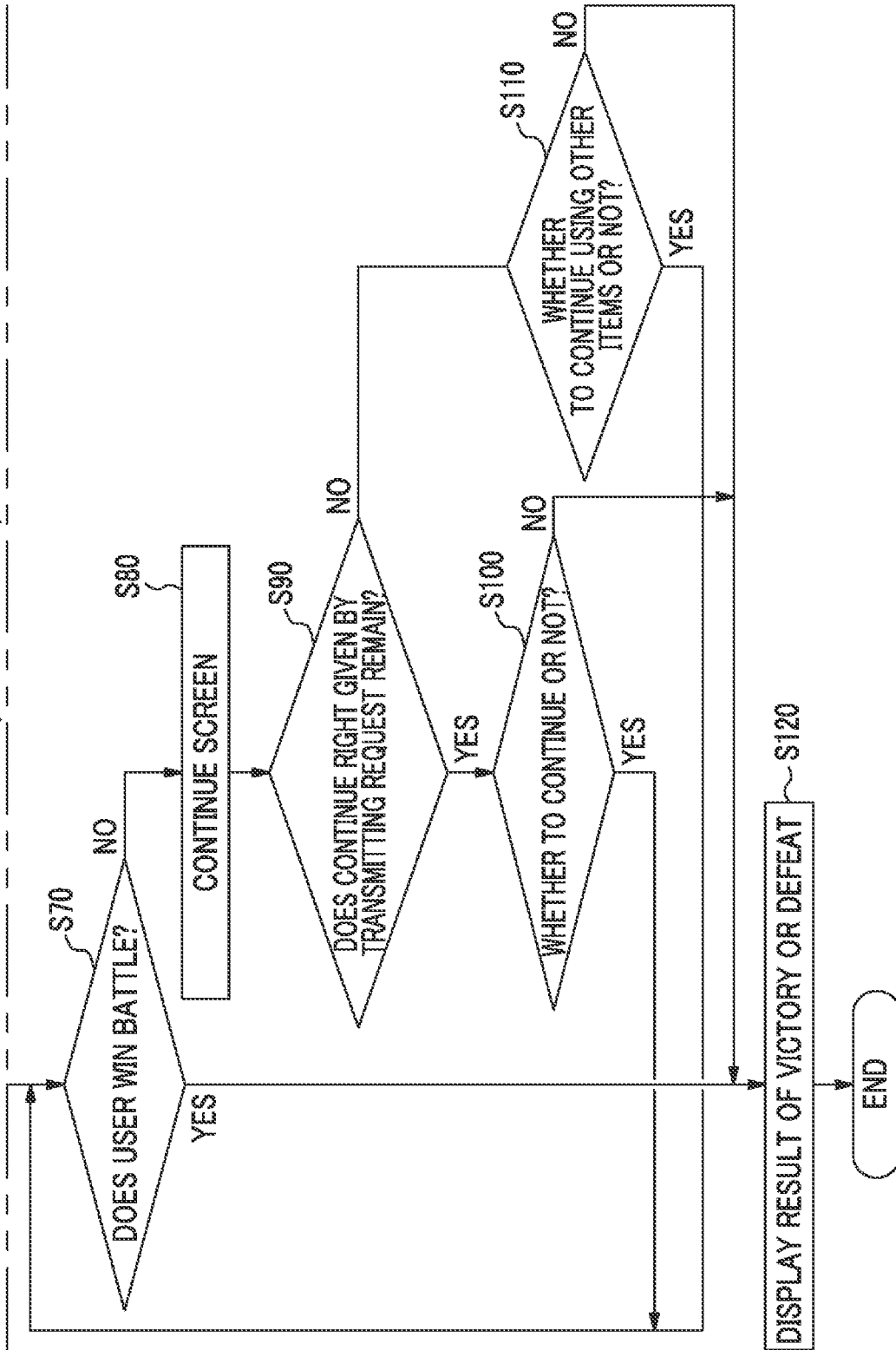

NON-TRANSITORY COMPUTER-READABLE MEDIUM STORING GAME PROGRAM, GAME PROCESSING METHOD, AND INFORMATION PROCESSING APPARATUS

CROSS REFERENCE TO RELATED APPLICATIONS

This application is a continuation of U.S. Ser. No. 14/446,946, filed Jul. 30, 2014, which claims benefit of JP 2013-201791, filed on Sep. 27, 2013, JP 2014-7364, filed on Jan. 20, 2014 and JP 2014-86284, filed on Apr. 18, 2014. The entire contents of the above applications are hereby incorporated by reference.

BACKGROUND OF THE INVENTION

Field of the Invention

The present invention relates to a non-transitory computer-readable medium storing a game program, a game processing method, and an information processing apparatus, and more particularly, to a non-transitory computer-readable medium storing a game program, a game processing method, and an information processing apparatus for a game which is played through a network.

Background Art

In recent years, with the spread of electronic devices, such as a smart phone or a tablet, games which are played on the electronic devices have been actively developed.

For example, Japanese Patent No. 5277305 discloses a game system for a game which is played through a network. This technique relates to a game system that gives a user certain points associated with the interaction between users through the network and allows the user to play a game capable of providing a reward, in interaction for the expenditure of a certain amount of points.

In the game, a reward corresponding to the degree of interaction between the users is generally given. The degree of the interaction is evaluated by the number of friends and/or the number of times items are transmitted to other users or the number of the items and the reward is determined based on the evaluation.

However, in the technique disclosed in Japanese Patent No. 5277305, the reward related to the game is not directly obtained by the interaction between the users and the technique has no effect on a dormant user who does not participate in the game. Therefore, the technique is insufficient to activate the interaction.

SUMMARY OF THE INVENTION

The invention has been made in view of the above-mentioned problems and an object of the invention is to provide a non-transitory computer-readable medium storing a game program, a game processing method, and an information processing apparatus which can activate interaction between users.

According to an aspect of the invention, there is provided a non-transitory computer-readable medium storing a game program for a game played through a network that causes a computer to realize: a selection receiving function of receiving, from one user, the selection of whether to transmit a message to other user; an extraction function of extracting at least one other user to which the message is transmitted, on the basis of a certain condition; a message transmitting function of transmitting the message to the at least one other user extracted by the extraction function when the selection receiving function receives the selection indicating that the message is transmitted to the other user; and a reward giving function of giving a reward to the one user when the message transmitting function transmits the message to the at least one other user extracted by the extraction function.

The non-transitory computer-readable medium storing a game program according to the above-mentioned aspect may further cause the computer to realize a screen display control function of displaying a screen for prompting the transmission of the message including information about the at least one other user extracted by the extraction function to the one user.

The non-transitory computer-readable medium storing a game program according to the above-mentioned aspect may further cause the computer to realize a setting function of setting the at least one other user extracted by the extraction function as a transmission destination of the message, regardless of the selection of the one user.

The non-transitory computer-readable medium storing a game program according to the above-mentioned aspect may further cause the computer to realize a check function of checking whether the one user selects the transmission of the message to the at least one other user within a certain period of time. When the check function checks that the one user does not select the transmission of the message to the at least one other user within the certain period of time, the screen display control function may display the screen for prompting the transmission of the message to the one user.

The reward may be lost when the reward is not used within a certain period of time.

The other user may be dormant user who had played the game and has not played the game for a certain period of time or more.

The other user may be dormant user who had played the game at a high frequency for a certain period of time.

The one user may be an active user who plays the game at a certain frequency or more.

The message may prompt the other user to participate in the game.

According to another aspect of the invention, there is provided a method for processing a game which is played through a network. The game processing method includes: allowing selection receiving means to receive, from one user, the selection of whether to transmit a message to other user; allowing extraction means to extract at least one other user to which the message is transmitted, on the basis of a certain condition; allowing message transmission means to transmit the message to the extracted the at least one other user extracted by the extraction means when the selection receiving means receives the selection indicating that the message is transmitted to the other user in the reception of the selection; and allowing reward giving means to give a reward to the one user when the message is transmitted to the at least one other user extracted by the extraction means in the transmission of the message.

According to still another aspect of the invention, there is provided an information processing apparatus for a game which is played through a network. The information processing apparatus includes: a selection receiving unit that receives, from one user, the selection of whether to transmit a message to other user; an extraction unit that extracts at least one other user to which the message is transmitted, on the basis of a certain condition; a message transmitting unit that transmits the message to the extracted the at least one other user extracted by the extraction unit when the selection receiving unit receives the selection indicating that the message is transmitted to the other user; and a reward giving unit that gives a reward to the one user when the message transmitting unit transmits the message to the at least one other user extracted by the extraction means.

According to the non-transitory computer-readable medium storing a game program, the game processing method, and the information processing apparatus of the aspects of the invention, since a reward is given to a message transmitter, it is possible to activate the interaction between the users.

DETAILED DESCRIPTION OF THE INVENTION

First, an information processing apparatus according to an embodiment of the invention will be described with reference to the drawings.

Figure 1:
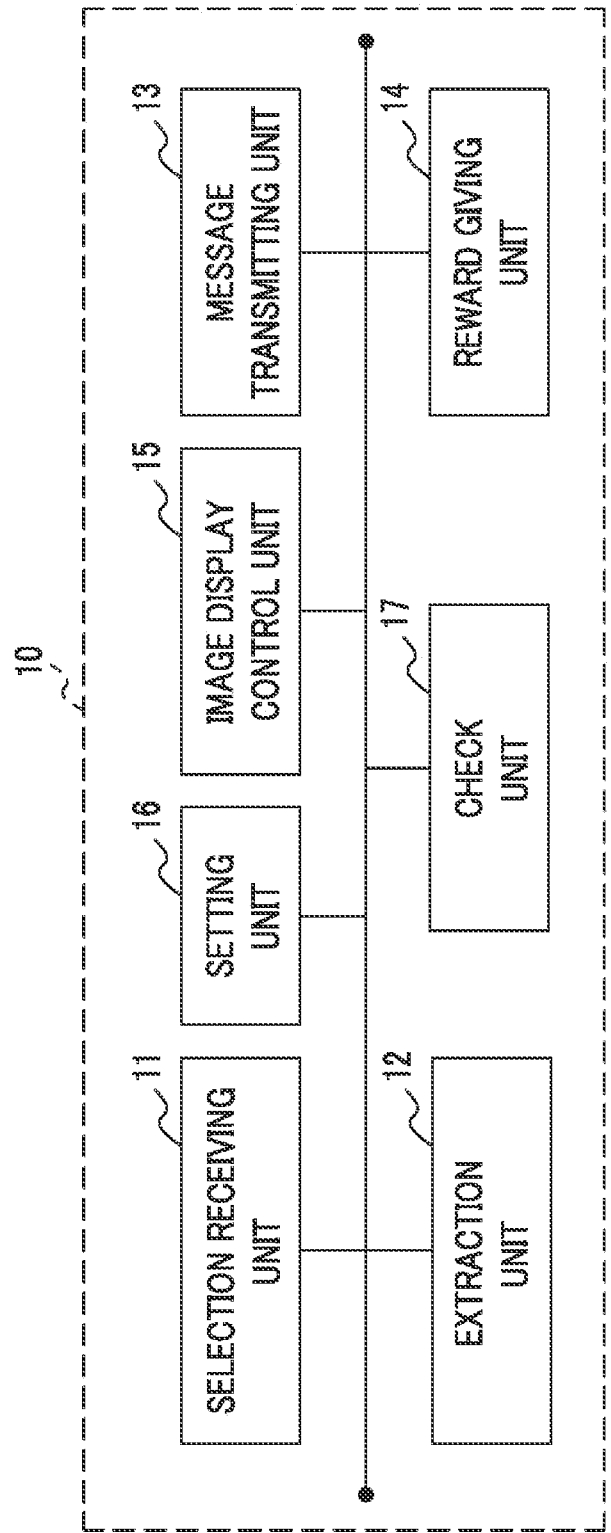
FIG. 1 is a diagram illustrating the structure of an information processing apparatus according to an embodiment of the invention.

As shown in FIG. 1, an information processing apparatus 10 processes information about a game which is played through a network and includes a selection receiving unit 11, an extraction unit 12, a message transmitting unit 13, and a reward giving unit 14. In the example shown in FIG. 1, the information processing apparatus 10 further includes a screen display control unit 15, a setting unit 16, and a check unit 17.

The selection receiving unit 11 receives, from one user, the selection of whether to transmit a message to other user. The message can be, for example, a sentence which is freely made by the one user, a sentence which is selected from fixed sentences by the one user, or a sentence which is automatically selected by the information processing apparatus 10.

The extraction unit 12 extracts at least one other user to which the message is transmitted, on the basis of certain conditions. The extraction may be performed before the selection receiving unit 11 receives the selection of whether to transmit the message, or it may be performed after the selection receiving unit 11 receives the selection of whether to transmit the message.

The certain conditions are extraction conditions corresponding to the object to be extracted. For example, when a dormant user is the object to be extracted, the extraction conditions are that the user does not play the game for a certain period of time.

When the selection receiving unit 11 receives the selection of whether to transmit the message to the other user, the message transmitting unit 13 transmits the message to the at least one other user extracted by the extraction unit 12.

When the message transmitting unit 13 transmits the message to the at least one other user extracted by the extraction unit 12, the reward giving unit 14 gives a reward to the one user.

The reward can be given as, for example, in-game currency, an item, or a specific right. The specific right can be, for example, a continue right to revive a character operated by the user in the game and continue the game when the character is killed by the enemy, or a right to do an event again when it is difficult for the user to progress through the event.

As such, according to the information processing apparatus 10 of the invention, a reward is given to the transmitter of the message to urge the transmitter to transmit the message. Therefore, the information processing apparatus 10 according to the invention further activates the interaction between the users.

The screen display control unit 15 can display a screen for prompting the transmission of the message including information about the at least one other user extracted by the extraction unit 12 to the one user.

The setting unit 16 can set the at least one other user extracted by the extraction unit 12 as the transmission destination of the message, regardless of the selection of the one user.

The check unit 17 checks whether the one user selects the transmission of the message to the at least one other user within a certain period of time. The check unit 17 may store the number of messages transmitted by the one user and/or transmission targets.

The screen display control unit 15 displays a screen for prompting the transmission of the message to the one user. In addition, when the check unit 17 checks that the one user does not select the transmission of the message to the at least one other user within a certain period of time, the screen display control unit 15 can display a screen for prompting the transmission of the message to the one user.

The screen for prompting the transmission of the message can be displayed on a certain game screen for a certain period of time at a certain display position, and with a certain display size so as not to hinder the operation of the user or the progress of the game.

The screen for prompting the transmission of the message can be displayed for a certain period of time for which the user wants a reward. The screen for prompting the transmission of the message can be displayed on, for example, a screen displayed when the user does not have enough money to purchase an item and/or a battle defeat screen.

When the reward is not used for a certain period of time, it can be lost. For example, when the reward is not used in a message transmission date, it can be lost.

The other user can be dormant user who had played the game and has not played the game for a certain period of time or more. When the dormant user receives the message, it is possible to give the dormant user a chance to play the game again.

The certain period of time can be changed depending on the situation of the game or the user. For example, the certain period of time can be shortened before the end date of an event in the game or the expiration date of the items of other users.

The other user can be dormant user who had played the game at a high frequency for a certain period of time. The reason is that, when receiving the message, such dormant user is likely to play the game again.

The other user can be user who actively played the game for a play period. The user who actively played the game is, for example, a user who acquired a large number of items, a user who had a long total game play time, or a user who had a good battle record in the game.

The one user can be an active user who plays the game at a certain frequency or more.

The one user can be a user who is active in the game. The one user can be, for example, a user who acquires a large number of items or a user who has a good battle record in the game.

When other users who receive the message participate in the game again, the reward may be given to the one user. The reward may be given depending on the number of users who participate in the game again and/or the situation of the users. The situation of the users can be, for example, the duration of the dormant period of the user and/or the past records of the users.

The one user can be a user who requires a reward in the game. The one user can be, for example, a user who has a small amount of currency in the game, a user who has a small number of items, and/or a user who has a bad battle record.

The message can be a message which prompts the user to participate in the game. The message can be, for example, information about an event in the game, information about a new quest, or the evaluation of the user for the game.

The number of times the message is transmitted can be limited for a certain period of time. The number of times the message is transmitted can be limited to, for example, once a day, once for an event period, and/or once for a period for which the reward is not used.

When the other users receive the message and participate in the game again, the reward may be given to the other user. The reward can be given depending on the situation of other users. The situation of other users can be, for example, the duration of the dormant period of the other users and/or the past records of the other users.

Next, a game processing method according to an embodiment of the invention will be described with reference to the drawings.

Figure 2:
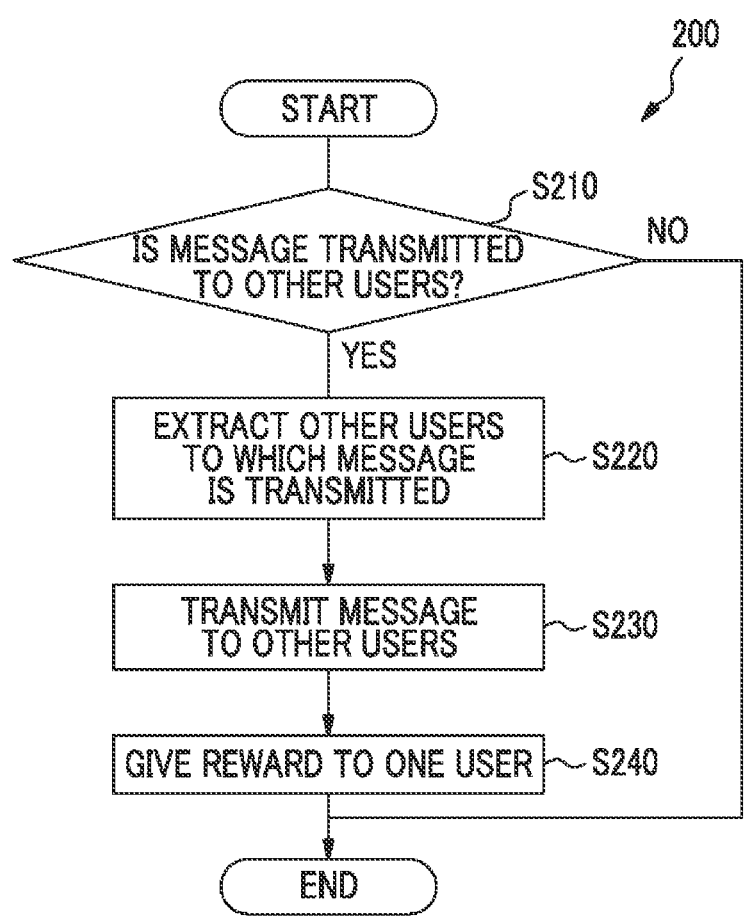
FIG. 2 is a flowchart illustrating a game processing method according to an embodiment of the invention.

FIG. 2 is a flowchart illustrating the flow of the game processing method according to the embodiment of the invention.

A game processing method (S200) according to the invention processes the game played through the network and includes a selection receiving step (S210), an extraction step (S220), a message transmitting step (S230), and a reward giving step (S240).

In the selection receiving step (S210), selection receiving means receives, from one user, the selection of whether to transmit the message to other user. The selection receiving means can be, for example, the selection receiving unit 11. The process of the selection receiving unit 11 has been described above.

In the extraction step (S220), when the selection indicating that the message is transmitted to the other user is received in the selection receiving step (S210), extraction means extracts at least one other user to which the message is transmitted, on the basis of certain conditions. The extraction means can be, for example, the extraction unit 12. The process of the extraction unit 12 has been described above.

In this embodiment, the extraction step (S220) is performed after the selection indicating that the message is transmitted to the other user is received in the selection receiving step (S210). However, the extraction step (S220) may be performed before the selection receiving step (S210).

In the message transmitting step (S230), message transmitting means transmits the message to the at least one other user extracted by the extraction means. The message transmitting means can be, for example, the message transmitting unit 13. The process of the message transmitting unit 13 has been described above.

In the reward giving step (S240), when the message is transmitted to the at least one other user extracted by the extraction means in the message transmitting step (S230), reward giving means gives a reward to the one user. The reward giving means can be, for example, the reward giving unit 14. The process of the reward giving unit 14 has been described above.

Next, an example of a game program according to an embodiment of the invention will be described.

The game program according to the invention processes the game played through the network and causes a computer to realize a selection receiving function, an extraction function, a message transmitting function, and a reward giving function.

The selection receiving function receives, from one user, the selection of whether to transmit the message to other user. For example, the selection receiving function can be realized by the selection receiving unit 11. The process of the selection receiving unit 11 has been described above.

When the selection receiving unit receives the selection indicating that the message is transmitted to the other user, the extraction function extracts at least one other user to which the message is transmitted, on the basis of certain conditions. For example, the extraction function can be realized by the extraction unit 12. The process of the extraction unit 12 has been described above.

The message transmitting function transmits the message to the at least one other user extracted by the extraction function. For example, the message transmitting function can be realized by the message transmitting unit 13. The process of the message transmitting unit 13 has been described above.

When the message is transmitted to the at least one other user extracted by the extraction function by the message transmitting function, the reward giving function gives a reward to the one user. For example, the reward giving function can be realized by the reward giving unit 14. The process of the reward giving unit 14 has been described above.

The game program can be recorded on a computer-readable recording medium and then provided. The recording medium is not particularly limited as long as it can be read by the computer. For example, the recording medium is a CD-ROM or a DVD.

Figure 3:
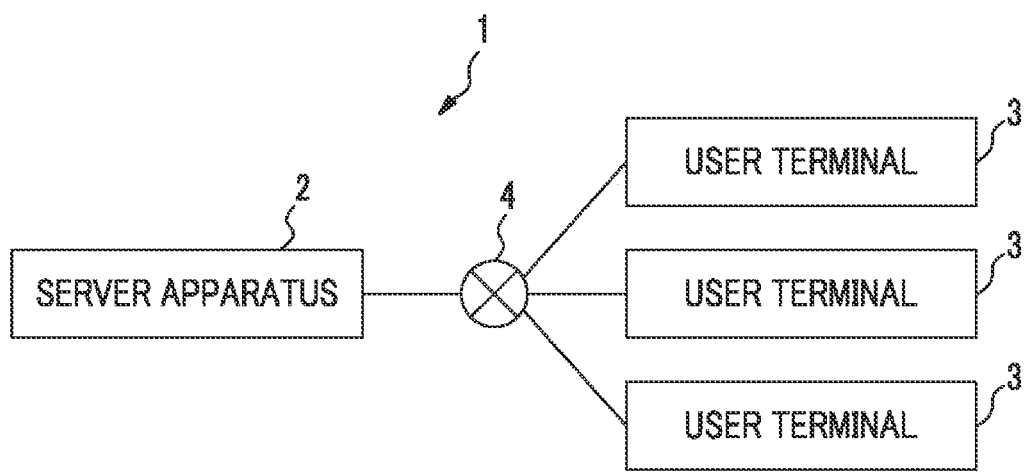
FIG. 3 is a diagram illustrating the structure of a game system according to an embodiment of the invention.

FIG. 3 is a diagram illustrating the structure of a game system 1 according to an embodiment of the invention.

In the game system 1 according to the invention, a server apparatus 2 is connected to one or more user terminals 3 through a network 4.

The game program according to the invention can be executed by the server apparatus 2 or the user terminal 3 or it can be separately executed by the server apparatus 2 and the user terminal 3.

Similarly, the information processing apparatus 10 can be the server apparatus 2 or the user terminal 3 or it can be a combination of the server apparatus 2 and the user terminal 3.

Figure 4:
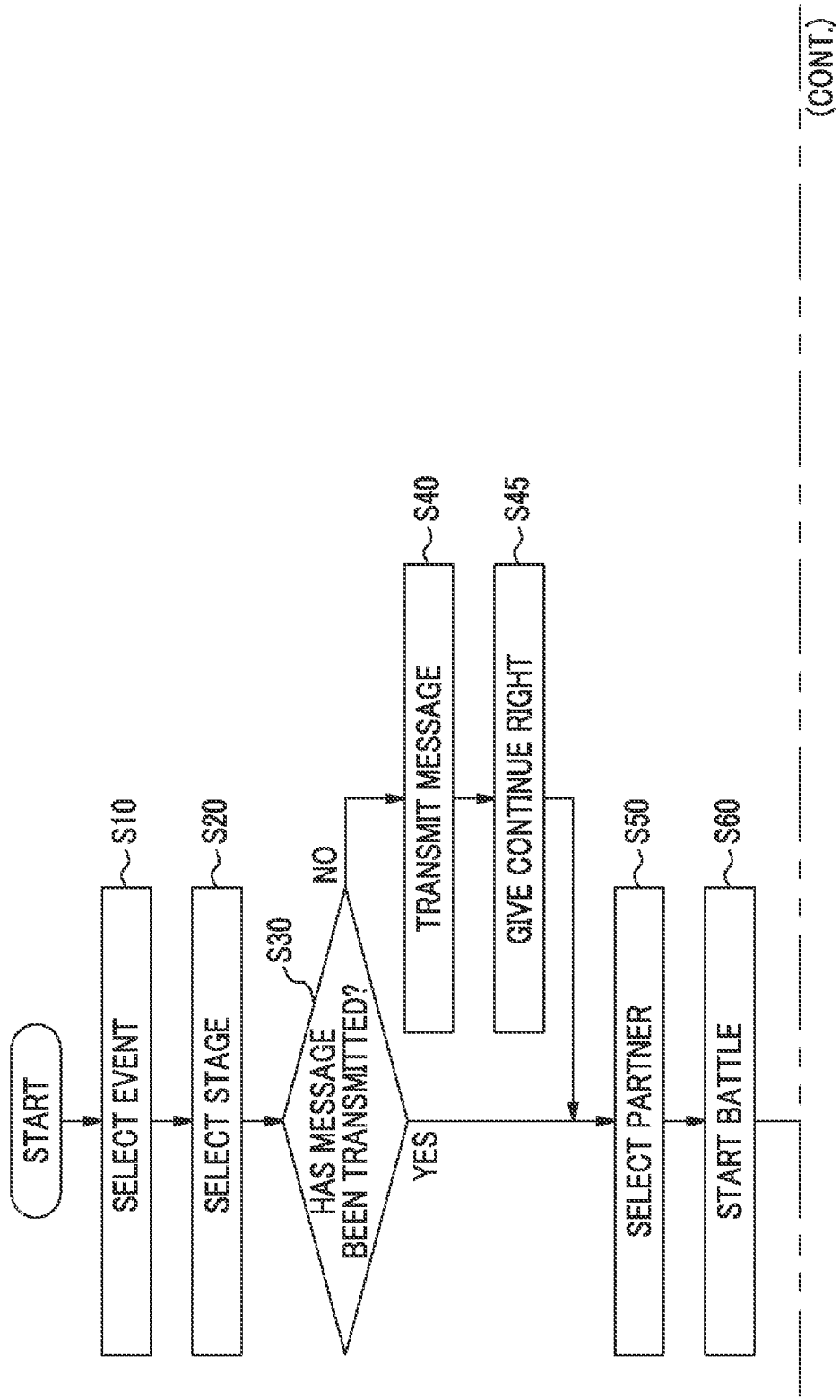
FIG. 4 is a flowchart illustrating the flow of a game according to an embodiment of the invention.

FIG. 4 is a flowchart illustrating an example of the flow of the game realized by the game program, the game processing method, and the information processing apparatus 10 according to the invention.

As shown in FIG. 4, when the user starts the game, a game top screen is displayed, an event is selected, and a stage selection screen is displayed (S10). Then, when a stage is selected, it is determined whether a request, which is a message for prompting the dormant user to participate in the game, is transmitted (S20 and S30). When the request is transmitted, the process proceeds to a partner selection screen (S50). When the request is not transmitted, a request transmission screen is displayed. After the user performs an operation, the process proceeds to the partner selection screen (S40 and S50). When the user performs a request transmission operation, a continue right, which is a reward for the transmission of the request, is given to the user (S45).

Then, a partner is selected and a battle starts (S60).

When the user wins the battle, the result of a victory or a defeat is displayed and the battle ends (S70 and S120).

When the user loses the battle, the battle is interrupted and a continue screen is displayed (S80). When a continue right given by transmitting the request remains, a continue selection screen is displayed (S90 to S100). When the continue right given by transmitting the request does not remain, a "continue" selection screen using other items is displayed (S110).

When the execution of "continue" is selected, the interrupted battle is resumed. When the execution of "continue" is not selected, the result of a victory or a defeat is displayed and the battle ends (S120). The resumed battle can take over the battle situation before the interruption. Examples of the taking-over of the battle situation before the interruption can include a case in which damage to the enemy before the interruption remains and/or a case in which the effects of the items used before the interruption are maintained.

Figure 5:
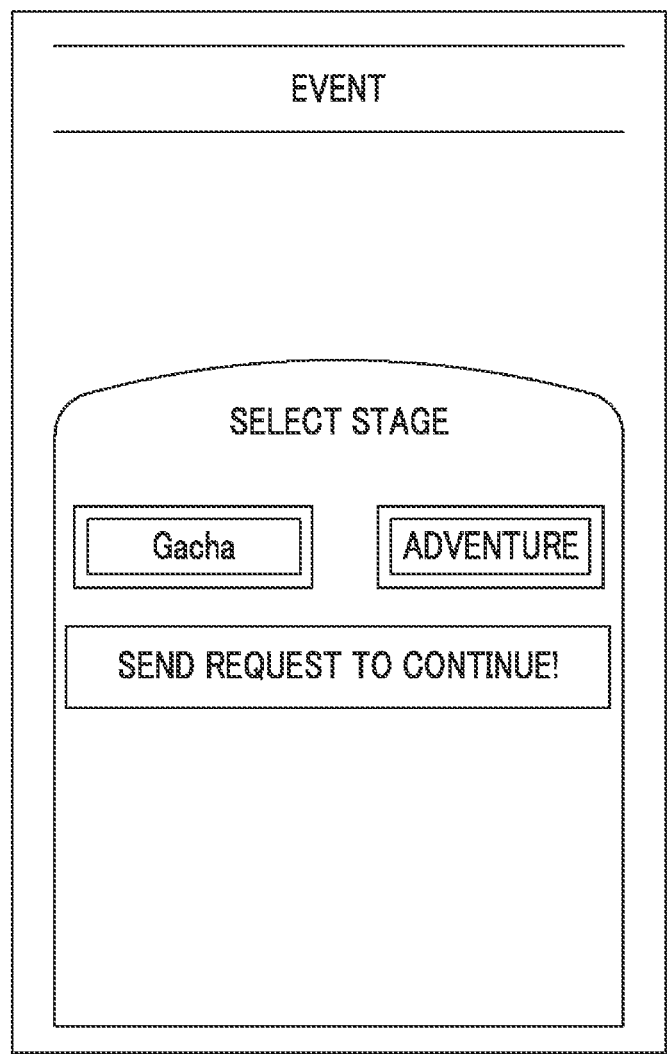
FIG. 5 is a schematic diagram illustrating an example of the game according to the invention.

In this embodiment, the request transmission screen is displayed after the stage is selected. However, as shown in FIG. 5, the request transmission screen may be displayed when the user presses a button displayed on the screen. For example, the button can be displayed together with each selection item on a screen for selecting events and/or stages.

Figure 6:
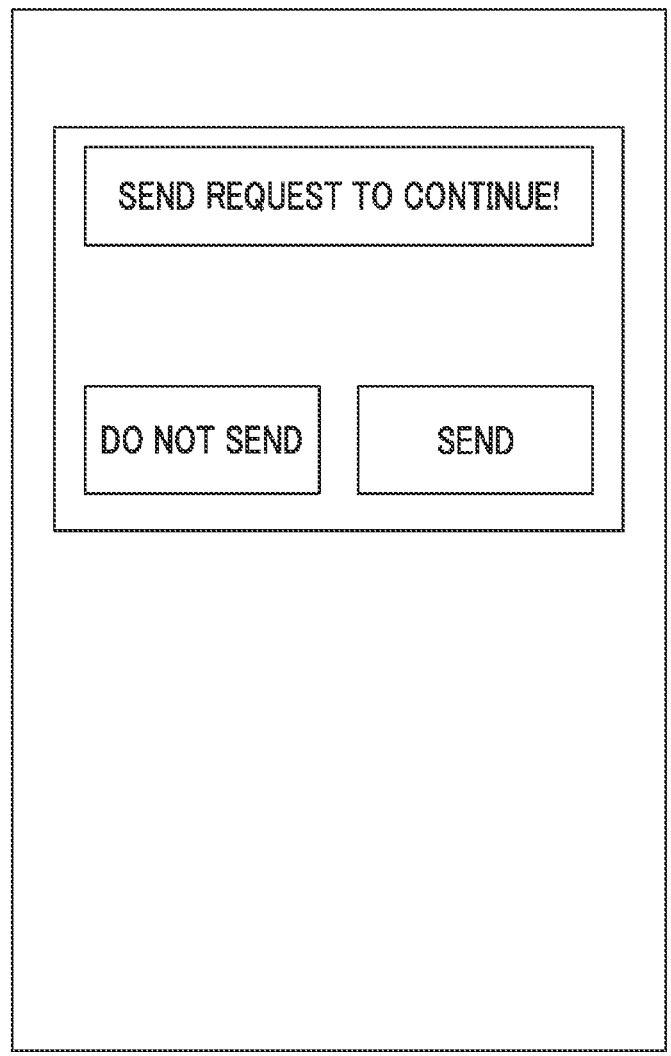
FIG. 6 is a schematic diagram illustrating an example of the game according to the invention.

As shown in FIG. 6, the request transmission screen may pop up on the screen at any time.

Figure 7:
FIG. 7 is a schematic diagram illustrating an example of the game according to the invention.

As shown in FIG. 7, one or more transmission targets can be displayed on the request transmission screen. For example, the user name of each user and/or the avatar of the user can be displayed on the request transmission screen.

The displayed user is set as the transmission destination of the message. When the user presses a "SEND" button to select the transmission of the message, the message can be collectively transmitted to all of the displayed users. In addition, the upper limit of the number of displayed users can be set, considering a screen display area of an information processing apparatus. Furthermore, a dormant user who has not played the game for a short time, a dormant user who had frequently played the game for a certain period of time, or a dormant user who was active for a play period can be preferentially displayed on the transmission screen.

The above-described embodiments are representative examples, but the invention is not limited to the above-described embodiments.

What is claimed is:

1. A method comprising:
   extracting, by one or more processors, a dormant user who previously played a game but has not played the game for a first period of time or more;
   automatically displaying, by the one or more processors, to an active user, a screen prompting transmission of an invitation message in response to the active user having not transmitted the invitation message to other users within a second period of time;
   receiving from the active user, by the one or more processors, a selection of whether to transmit the invitation message to the dormant user;
   transmitting, by the one or more processors, the invitation message from the active user to the dormant user in response to the selection being received indicating that the invitation message is to be transmitted to the dormant user; and
   giving, by the one or more processors, a reward to the dormant user and/or the active user in response to the one or more processors confirming that the dormant user has received the invitation message and that the dormant user has participated in the game after receiving the invitation message.

2. The method according to claim 1,
   wherein the screen prompting transmission of the invitation message is automatically displayed to the active user in response to the one or more processors confirming that the active user does not have a first amount of currency in the game, or that the active user loses in the game.

3. The method according to claim 1,
   wherein the invitation message is a message prompting the dormant user to return to the game.

4. An information processing apparatus comprising: one or more processors programmed to:
   extract a dormant user who previously played a game but has not played the game for a first period of time or more,
   automatically display to an active user a screen prompting transmission of an invitation message in response to the active user having not transmitted the invitation message to other users within a second period of time;
   receive from the active user a selection of whether to transmit the invitation message to the dormant user;
   transmit the invitation a message from the active user to the dormant user in response to the selection being received indicating that the invitation message is to be transmitted to the dormant user, and
   give a reward to the dormant user and/or the active user in response to confirming that the dormant user has received the invitation message and that the dormant user has participated in the game after receiving the invitation message.

5. The information processing apparatus according to claim 4, wherein the screen prompting transmission of the invitation message is automatically displayed to the active user in response to confirming that the active user does not have a first amount of currency in the game, or that the active user loses in the game.

6. The information processing apparatus according to claim 4,
   wherein the invitation messages a message prompting the dormant user to return to the game.

7. A non-transitory computer-readable medium storing a program that causes a computer to realize:
   a first extraction function of extracting a dormant user who previously played a game but has not played the game for a first period of time or more;
   a screen display control function of automatically displaying to an active user a screen prompting transmission of an invitation message in response to the active user having not transmitted the invitation message to other users within a second period of time;

a selection receiving function of receiving from the active user a selection of whether to transmit the invitation message to the dormant user;

a message transmitting function of transmitting the invitation message from the active user to the dormant user in response to the selection being received indicating that the invitation message is to be transmitted to the dormant user; and a reward giving function of giving a reward to the dormant user and/or the active user in response to confirming that the dormant user has received the invitation message and that the dormant user has participated in a-the game after receiving the invitation message.

8. The non-transitory computer-readable medium according to claim 7,
wherein the screen prompting transmission of the invitation message is automatically displayed to the active user in response to confirming that the active user does not have a first amount of currency in the game, or that the active user loses in the game.

9. The non-transitory computer-readable medium according to claim 7,
wherein the invitation message is a message prompting the dormant user to return to the game.

* * * * *